United States Patent [19]

Lane

[11] Patent Number: 5,357,803
[45] Date of Patent: Oct. 25, 1994

[54] MICROMACHINED MICROACCELEROMETER FOR MEASURING ACCELERATION ALONG THREE AXES

[75] Inventor: Richard L. Lane, Penfield, N.Y.

[73] Assignee: Rochester Institute of Technology, Rochester, N.Y.

[21] Appl. No.: 866,667

[22] Filed: Apr. 8, 1992

[51] Int. Cl.$^5$ ............................................. G01P 15/13
[52] U.S. Cl. .................................. 73/517 B; 361/280
[58] Field of Search ............. 73/517 B, 517 R, 516 R; 361/280, 283.1; 310/309; 384/439

[56] References Cited

U.S. PATENT DOCUMENTS

| | | |
|---|---|---|
| 3,742,767 | 7/1973 | Bernard et al. |
| 4,068,533 | 1/1978 | Ferriss ............................ 73/517 B |
| 4,352,061 | 9/1982 | Matrone ......................... 324/158 P |
| 4,393,710 | 7/1983 | Bernard |
| 4,706,374 | 11/1987 | Murakami |
| 4,736,629 | 4/1988 | Cole |
| 4,893,509 | 1/1990 | MacIver et al. |
| 4,901,570 | 2/1990 | Chang et al. |
| 4,922,756 | 5/1990 | Henrion |
| 4,932,261 | 6/1990 | Henrion |
| 4,945,765 | 8/1990 | Rosxhart |

OTHER PUBLICATIONS

G. Bomchil, et al. "Formation and Oxidation of Porous Silicon for Silicon on Insulator Technologies" *Energy Beam–Solid Interactions and Transient Thermal Processing*, 1985, pp. 463–474.

D. W. Satchell, et al. "Silicon Microengineering for Accelerometers", *Rec. of the Int. Conf. on the Mech. Technol. of Inertial Devices*, 1987, pp. 191–193.

Richard S. Muller, "Heat and Strain-Sensitive Thin-Film Transducers", *Sensors and Actuators*, vol. 4, pp. 173–182, Dec. 1983.

L. M. Roylance, et al., "A Batch–Fabricated Silicon Accelerometer", *IEEE Trans. Electron Devices*, vol. ED-26, No. 12, pp. 1911-1917, Dec. 1979.

K. E. Petersen, "Silicon as a Mechanical Material", *Proc. IEEE*, vol. 70, No. 5, pp. 420–457, May 1982.

M. E. Motamedi, "Acoustic Accelerometers", *IEEE Trans. Ultrason. Ferroelec. Freq. Contr.*, vol. UFFC-34, No. 2, pp. 237–242, Mar. 1987.

Pau-Ling Chem, et al., "Integrated Silicon Microbeam PI-FET Accelerometer", *IEEE Trans. Electron Devices*, vol. ED-29, No. 1, pp. 27–33, Jan. 1982.

F. Rudolf, et al., "Silicon Microaccelerometer", *Transducers '87, Rec. of the 4th Int. Conf. on Solid–State Sensors and Actuators*, 1987, pp. 395-398.

*Primary Examiner*—John E. Chapman
*Attorney, Agent, or Firm*—Nixon, Hargrave, Devans & Doyle

[57] ABSTRACT

The present invention relates to a microaccelerometer employing a single free-mass and capable of measuring acceleration along three coordinate axes, and a process for fabricating through micromachining and microelectronic techniques a microaccelerometer employing a free-mass. A microaccelerometer preform is constructed by chemically coating and etching a silicon wafer to form a support member and a free-mass surrounded by the member. The free-mass is movable with respect to, but constrained by the silicon support member. Acceleration measurements are obtained by circuits which sense changes in the position of the free-mass with respect to an equilibrium position, induced by a change in the rate of acceleration of the accelerometer, and the electromagnetic force required to restore the free-mass to its equilibrium position.

18 Claims, 6 Drawing Sheets

MICROMACHINED MICROACCELEROMETER FOR MEASURING ACCELERATION ALONG THREE AXES

FIELD OF THE INVENTION

This invention relates to microaccelerometers and a process of fabricating them.

BACKGROUND OF THE INVENTION

An accelerometer is one of the major sensors used in navigational systems, particularly inertial navigational systems, and on-board automotive safety control systems. Automotive examples of accelerometer use include various anti-lock braking systems, active suspension systems, and seat belt lock-up systems.

More generally, an accelerometer is a device which measures acceleration and, in particular, an accelerometer measures the force that is exerted when a moving body changes velocity. The moving body possesses inertia, which tends to resist the change in velocity. It is this resistance to sudden change in velocity that is the origin of the force which is exerted by the moving body, and which is proportional to the acceleration component in the direction of the movement, when the moving body is accelerated.

Conventional manufacturing techniques for metal and insulation material are limited in their ability to produce mechanical assemblies that are smaller, or lower in cost, than the devices currently available. Thus, the prior art accelerometers are constrained by the materials utilized therein and the methods of fabrication thereof rather than by problems of mechanical or electrical design. It is thus desirable to provide a new technology for fabrication of accelerometers in order to reduce the size and cost thereof.

More particularly, it is desired to reduce the size of accelerometer devices in order to reduce the length of thermal and electrical conduction paths used therein. It is known that long paths of conduction may result in large thermal gradients. These effects reduce the accuracy, stability and performance of the accelerometer. Further, the large size of currently available accelerometers results in increased sensitivity to stray capacitance and electromagnetic radiation. Accordingly, the presently available accelerometers suffer from disadvantages caused by the large size thereof, including particularly limitations on stability and accuracy. Yet another disadvantage resulting from the large size of presently available accelerometers is a low resonant frequency of the proof mass caused by the increased size, which increases the response time of the accelerometer.

Accordingly, while prior art inertial accelerometers may have dynamic ranges and sensitivities which are in the neighborhood of one part in $10^7$, the performance of the accelerometer and its reliability may be improved by an order of magnitude upon a reduction in size.

Some accelerometers, as disclosed in U.S. Pat. Nos. 3,742,767 and 4,393,710 to Bernard, suspend the free-mass in its equilibrium position with electromagnetic forces from electrodes supported by a surrounding cage. Since the free-mass is not constrained by any physical attachment to the housing of the accelerometer, it can indicate acceleration in three coordinate systems. However, such accelerometers cannot be fabricated as integral units through micromachining techniques due to the difficulty of satisfactorily forming electrodes on the vertical walls of the accelerometer.

Microaccelerometers like the ones described in U.S. Pat. Nos. 4,922,756 and 4,932,261 to Henrion, F. Rudolph, A. Jornod and P. Bencze, *Silicon Microaccelerometers*, Transducers '87, Rec. of the 4th Int'l Conference on Solid-State Sensors and Actuators, 1987, 395–398, and D. Satchell and J. Greenwood, *Silicon Microengineering for Accelerometers*, Rec. of the Int. Conf. on the Mech. Technol. of Inertial Devices, 191–193, 1987, use a spring suspension system to position the proof-mass in an equilibrium position. When inertial forces displace the proof-mass from the equilibrium position, spring tension returns the proof-mass to its equilibrium position.

Another type of accelerometer, as described in U.S. Pat. No. 4,945,765 to Rosxhart, U.S. Pat. No. 4,901,570 to Chang, U.S. Pat. No. 4,893,509 to MacIver, U.S. Pat. No. 4,736,629 to Cole, U.S. Pat. No. 4,706,374 to Murakami, P. Chen, et al. *Integrated Silicon Microbeam PI-FET Accelerometer*, IEEE Trans. Electron Devices, Vol. ED-29, no. 1, 27–33, January 1982, M. Motamedi, *Acoustic Accelerometers*, IEEE Trans. Ultrason. Ferro Elec. Freq. Contr. Vol., UFFC-34, no. 2, 237–242, March 1987, K. Petersen, *Silicon as a Mechanical Material*, Proc. IEEE, Vol. 70, no. 5, 420–457, May 1982, L. Roylance, *A Batch-Fabricated Silicon Microaccelerometer*, IEEE Trans. Electron Devices, Vol. ED-26, no. 12, 1911–1917, December 1979, and R. Muller, *Heat and Strain Sensitive Thin-Film Transducers*, Sensors and Actuators, Vol. 4, 173–182, December 1983, employs a cantilever system to maintain the proof-mass in an equilibrium position and return it to that position after its displacement during acceleration.

Although accelerometers utilizing the spring and cantilever systems can be constructed to a microelectronic size by micromachining techniques, movement of their proof-masses is constrained in at least one of three dimensions. Further, such systems lack the sensitivity and linearity achieved with free-floating masses. In view of these disadvantages of current microaccelerometers, a need exists for new designs which can be fabricated by micromachining techniques, yet have free-floating masses which generate sensitive readings.

SUMMARY OF THE INVENTION

The microaccelerometer of the present invention is formed from a thin planar sheet having a cavity extending between opposed surfaces of the sheet. The cavity has a cross-section which has a narrowest point at an interior location in said sheet. The microaccelerometer also includes a free-mass positioned within the cavity and having a pair of wide ends joined by a central portion. This free-mass configuration orients the free-mass at an equilibrium position relative to the sheet absent movement and constrains the free-mass from falling out of the cavity during movement. The microaccelerometer also has a position correction device which returns the free-mass to its equilibrium position and which generates signals indicative of the restorative force needed to do so. The microaccelerometer also includes a sensor to detect the free-mass's position relative to the sheet and to generate signals indicative of that position. A computer generates an acceleration value from the signals indicative of the restorative force and the signals indicative of the free-mass position.

The sheet and free-mass subassembly for the microaccelerometer of tile present invention is prepared by a micromachining fabrication procedure. This involves forming a cavity in a planar sheet and coating a sacrificial layer on the opposed surfaces of the sheet and on its walls defining the cavity. An outer layer is then applied over the sacrificial layer to bridge the cavity at its narrowest point. After the sacrificial layer is removed from the cavity, the outer layer forms a free-mass which is restrained by and moveable with respect to the sheet.

DETAILED DESCRIPTION OF THE DRAWINGS

One form of the present invention is directed to a process of preparing a microaccelerometer preform using microelectronic fabrication techniques. FIGS. 1-11 and 13-14 sequentially illustrate this process.

Figure 1:
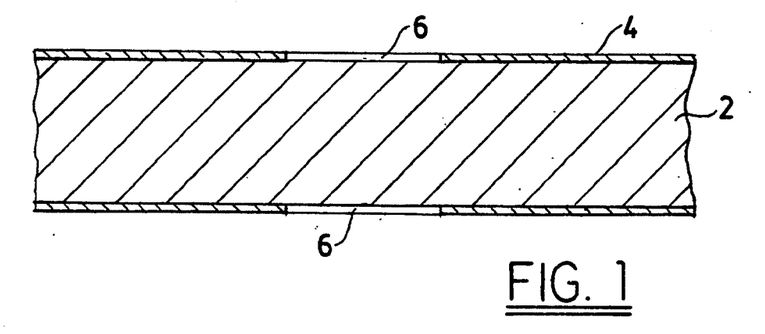
FIG. 1 is a cross-sectional view of a silicon wafer partially coated with an oxide layer.

FIG. 1 is a cross-section of a planar sheet, formed from a silicon wafer 2, which acts as a support and free-mass constraint in the microaccelerometer of the present invention. Preferably, the wafer is a <100> orientation silicon wafer, which has desirable micromachinability characteristics. Any material which can be machined on a small scale, however, will suffice. Silicon wafer 2 should have a thickness of preferably 4-6 mils. Masking oxide layer 4, which acts as a mask and has a thickness of 0.5 to 1.5 microns, preferably 1 micron, is applied to the surfaces of wafer 2. Masking oxide layer 4 is applied by either thermal oxidation, sometimes known as oxide growth, or deposition.

Oxide growth uses the silicon from silicon wafer 2 to combine with oxygen at high temperatures to form silicon dioxide. In the preferred embodiment of the invention, this is performed at a temperature between 950° C. and 1200° C. Silicon wafer 2 is placed in a tube furnace, and oxygen is flowed through the tube. One micrometer of oxide can be grown in approximately 42 hours at 1100° C. in pure oxygen. The growth rate is substantially increased if a small amount of water is added along with the oxygen. In that case, one micron of oxide can be grown in about 2.5 hours at 1100° C. For a one micron oxide layer, the process consumes about 0.5 microns of silicon wafer 2.

Alternatively, an oxide layer can be formed by the deposition of silicon dioxide on the surface of wafer 2. Rather than consuming silicon wafer 2, as in thermal oxidation, the process of deposition requires the addition of oxide to the surface of silicon wafer 2. Acceptable deposition methods are chemical vapor deposition (CVD), sputtering, or molecular beam deposition.

The preferred method for application of the initial masking oxide 4 is thermal oxidation because it is simple and reliable. However, the etching properties of the CVD oxide may be preferred for later etching with hydrofluoric acid (HF), in that it has a fairly fast etch rate compared with thermal oxide.

Masking oxide 4 is then patterned to form aligned square holes 6, each of which has sides of 50-100 microns. Patterning of the masking oxide 4 is performed by applying a photosensitive resist to the entire silicon wafer 2, exposing a portion of it with an optical image and developing. During development, unexposed portions of photoresist are removed by the developer solution. After development, aligned square holes 6 are produced by etching the portions of oxide 4 from which unexposed photoresist was removed. This etching is performed with hydrofluoric acid (HF) because it does not attack silicon. The remaining photoresist is then removed by using an oxygen plasma or acetone solvent.

Figure 2:
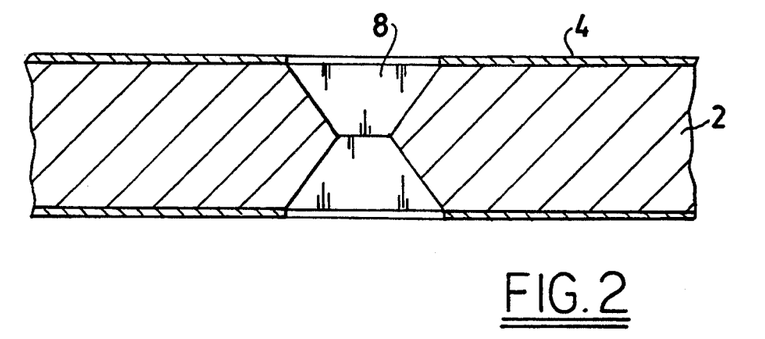
FIG. 2 is a cross-sectional view of the silicon wafer of FIG. 1 with a frustopyramidal cavity.

Masking oxide layer 4 surrounding square holes 6 acts as a mask for wafer 2 during the etching of cavity 8. As a result, when the etching agent, hot KOH, is applied to silicon wafer 2, a cavity is formed between the surfaces of silicon wafer 2 which formerly were exposed through square holes 6. FIG. 2 is a cross-sectional view of wafer 2 with an opposing frustopyramidal cavity 8 formed therein as a result of such orientation-dependent selective etching. Other suitable etching agents include solutions of sodium hydroxide, ammonium hydroxide, and 50/50 hydrazine/water, and also a mixture of ethylenediamine, pyrocatechol and water, known as EDP. The inner walls of the frustopyramidal configuration of cavity 8 are sloped to facilitate their coating in later processing steps.

Figure 3:
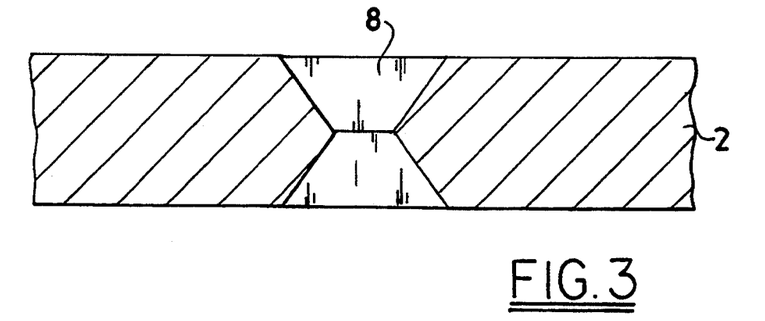
FIG. 3 is a cross-sectional view of the silicon wafer of FIG. 2 with the oxide layer removed.
Figure 4:
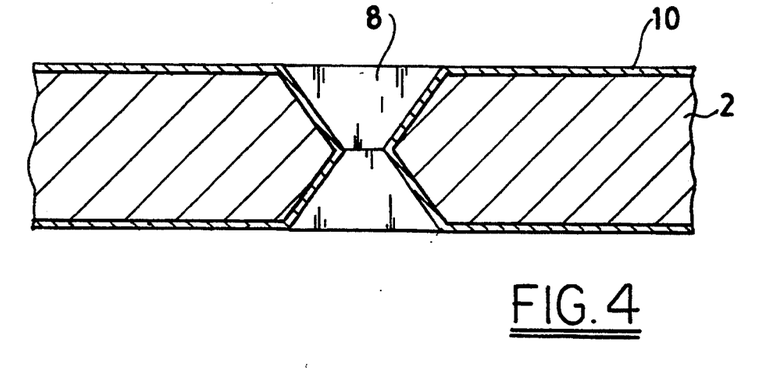
FIG. 4 is a cross-sectional view of the silicon wafer of FIG. 3 with an oxide layer coating all surfaces of the wafer.

After cavity 8 is formed, oxide layer 4 is removed from wafer 2, as shown in the cross-sectional view of FIG. 3, preferably by a solution of buffered hydrofluoric acid (BHF). This solution consists of hydrofluoric acid with small amounts of ammonium fluoride to help maintain a constant etch rate over a long period of time. The BHF may be diluted with various amounts of water to control the etch rate. Next, as depicted in the cross-sectional view of FIG. 4, oxide layer 10 is coated on all surfaces of wafer 2, including the walls defining cavity 8. Oxide layer 10, which protects wafer 2 during later steps, is applied by thermal oxidation at a thickness of 0.3 to 1.0 microns, preferably 0.5 microns. Oxide layer 10 also acts as a mask when electrodes are subsequently applied to wafer 2.

Figure 5:
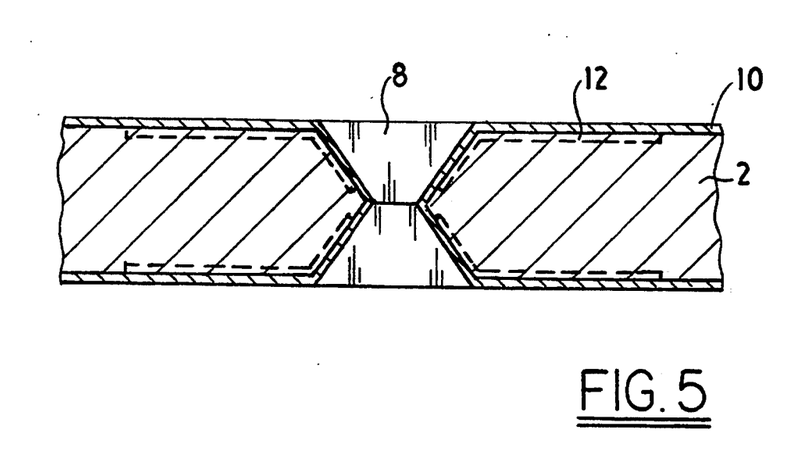
FIG. 5 is a cross-sectional view of the silicon wafer of FIG. 4 with a diffused electrode.

As shown in the cross-sectional view of FIG. 5, electrodes 12 are then formed on wafer 2 by introducing a dopant into wafer 2 through outlined portions of oxide layer 10. The portions are outlined by contact printing. The procedure for contact printing and diffusion is similar to that described above with regard to patterning of aligned square holes 6. In the preferred embodiment of the invention, a photoresist is applied to oxide layer 10 and then exposed by projecting an image on it in the areas surrounding the electrodes. The preferred method of application of photoresist is the electroplated resist method. Small amounts of electrically conductive material, such as chromium, are applied to the oxide by sputtering. The wafer is then immersed in photoresist electrolyte. Application of current through the cell deposits a layer of photoresist uniformly on all surfaces, regardless of topography. This is especially advantageous when dealing with materials having holes in them as does the present silicon wafer 2. Imaging exposure is conducted with a collimated light source shilling through a contact mask. Light energy polymerizes the photoresist. Developing removes photoresist from unexposed areas defining the electrode configuration. After patterning the photoresist, the wafer is immersed in BHF, which removes oxide only in the areas that are not protected by the photoresist. The photoresist acts as a barrier for the BHF etchant, which forms holes in the non-photoresist coated oxide. Finally, the photoresist is stripped off by an organic solvent such as acetone or with an oxygen plasma, leaving an oxide mask on the surface with holes in it. This patterned oxide allows dopant to enter the wafer only in areas outlined as the electrodes.

Diffusion is conducted through a high temperature doping process in which small quantities of impurity (dopant) are placed into the silicon wafer 2. Silicon wafer 2 is placed in a furnace in the presence of the dopant, for example phosphine gas. Phosphorous from the phosphine gas enters the silicon of silicon wafer 2, making it highly conductive compared to undoped silicon. The doping occurs only in the etched electrode configuration of the oxide.

Alternatively, the dopant can be provided by a planar source for uniform doping within cavity 8 and on the surface of silicon wafer 2. A planar source is a wafer of the same diameter as silicon wafer 2, placed in close proximity to silicon wafer 2. Heat from a furnace causes the dopant to migrate from the planar source wafer through the furnace atmosphere to silicon wafer 2. Planar sources generally are much safer to use than gaseous or liquid sources. Another suitable method for introducing a dopant is through ion implantation. In such a method, ions of a dopant, e.g., phosphorous ions, are accelerated at high velocity and penetrate into the wafer. Again, any portion of silicon wafer 2 covered by oxide layer 10 will not be doped. The depth and quantity of dopant introduced increase with higher temperatures and/or longer time.

During diffusion, a surface residue is typically produced in the doped regions, called the doped glass or doped oxide. This residue may have high concentrations of dopant in it. It is removed by BHF etching, and replaced with pure oxide for better electrical properties. When etching the residue, all previous oxide is removed including layer 10. A 0.5 micron insulating layer 11 is then grown or deposited over the entire surface of the silicon wafer 2 to act as insulation for electrodes 12. The insulating layer 11 can consist of either silicon dioxide or silicon nitride material. The 0.5 micron insulating layer 11 may either be deposited by CVD or grown to avoid consuming the doped silicon near the surface. The procedure for these operations was described above in connection with masking oxide layer 4.

Figure 6:
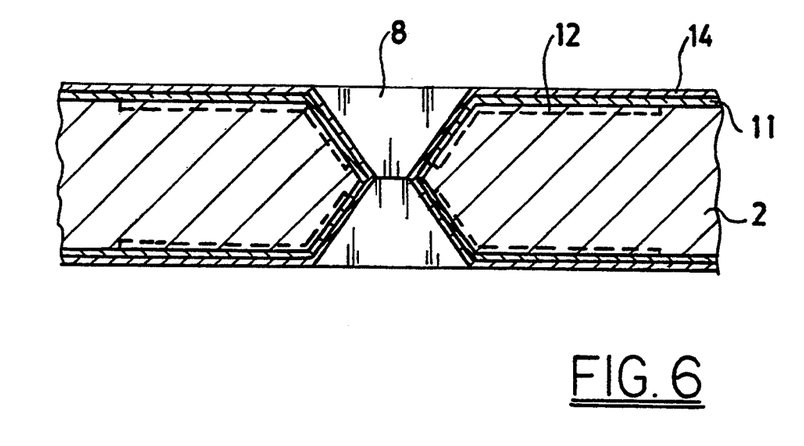
FIG. 6 is a cross-sectional view of the silicon wafer of FIG. 5 with a polysilicon layer coated over the oxide layer.
Figure 7:
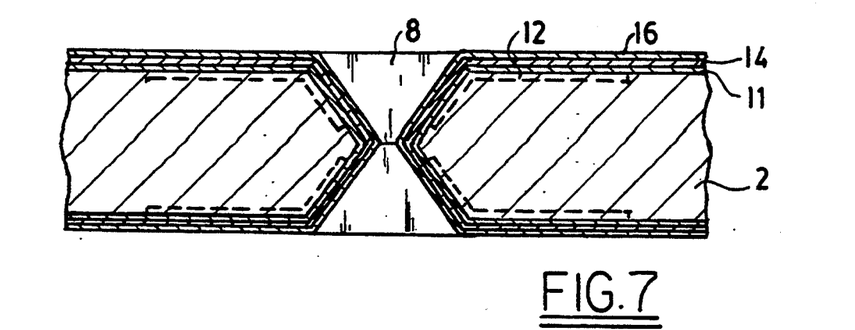
FIG. 7 is a cross-sectional view of the silicon wafer of FIG. 6 with an oxide layer coating over the polysilicon layer.
Figure 8:
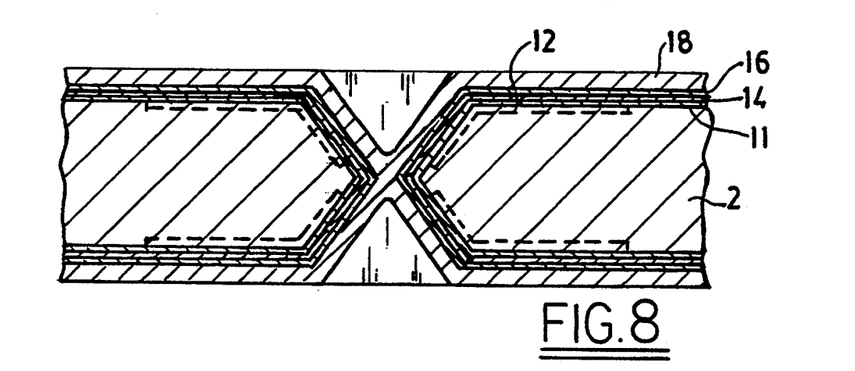
FIG. 8 is a cross-sectional view of the silicon wafer of FIG. 7 with a thick layer of polysilicon coating over the oxide layer.
Figure 10:
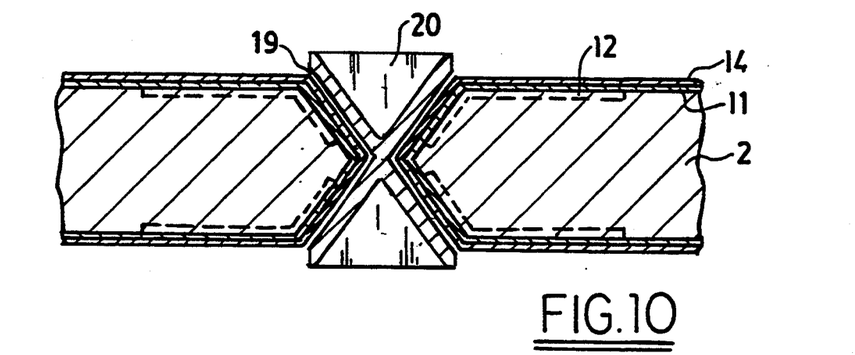
FIG. 10 is a cross-sectional view of the silicon wafer of FIG. 9 with the oxide layer removed to release the free-mass.
Figure 11:
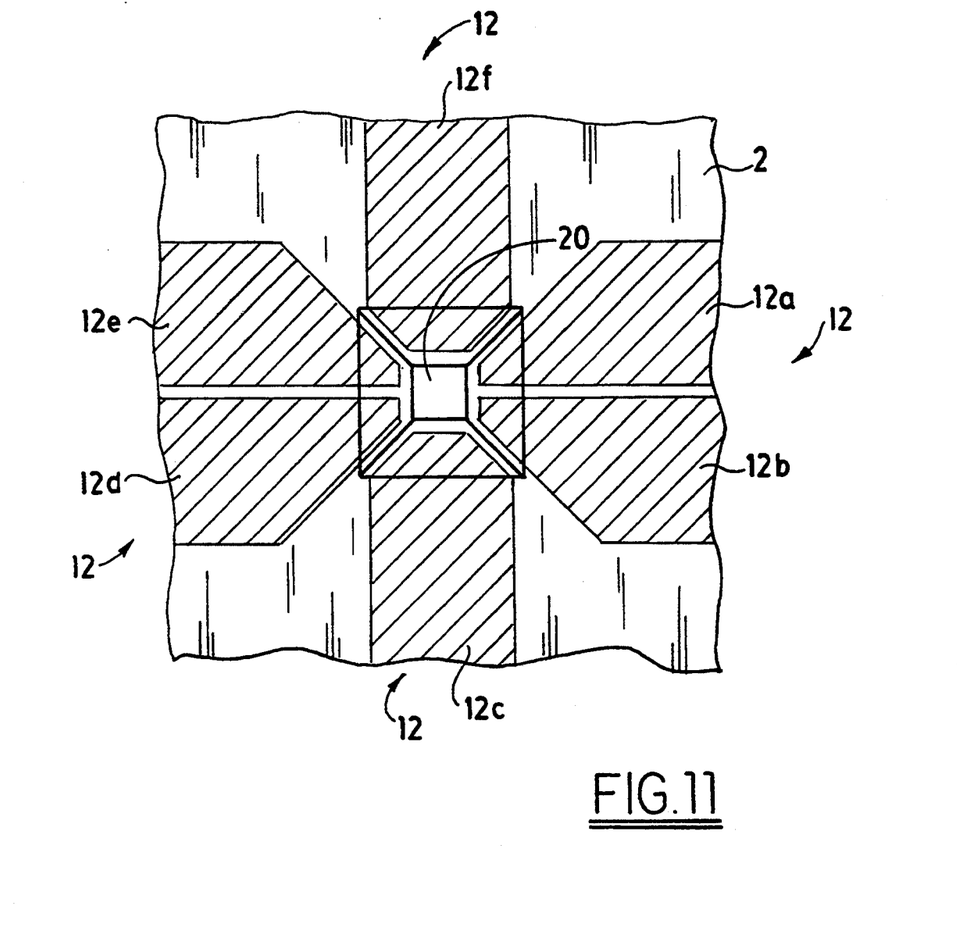
FIG. 11 is a plan view of the silicon wafer of FIG. 11 in which the electrode configuration can be seen.

After incorporation of electrodes 12, the configuration of which is shown in FIG. 11, a layer 14 of polysilicon is applied over wafer 2, as shown in the cross-sectional view of FIG. 6. Polysilicon may be applied by conventional CVD using $SiH_4$ at 250 mtorr at about 610° C. Polysilicon layer 14 protects insulating layer 11 during subsequent BHF etching steps. After the application of polysilicon layer 14, sacrificial oxide layer 16 is applied to wafer 2, as illustrated in FIG. 7. Sacrificial oxide layer 16 preferably is deposited by CVD to prevent consumption of polysilicon. It may also, however, be thermally grown. If the thickness of the gap 19 between free-mass 20 and wafer 2 (see FIG. 10) must be greater than 1 micron, oxide layer 16 should be deposited. Oxide layer 16 acts to release free-mass 20 after application of thick polysilicon layer 18, as shown in the cross-sectional view of FIG. 8, which is next applied to wafer 2 by CVD. The deposition process must be relatively long, oil the order of 1–8 hours to obtain a thick polysilicon layer. The thick polysilicon layer is grown with a dopant present (in-situ doping) so that the free mass will be electrically conductive. Accordingly a small amount of dopant gas such as phosphine or diborane is added to the precurser gas when depositing the polysilicon.

Figure 9:
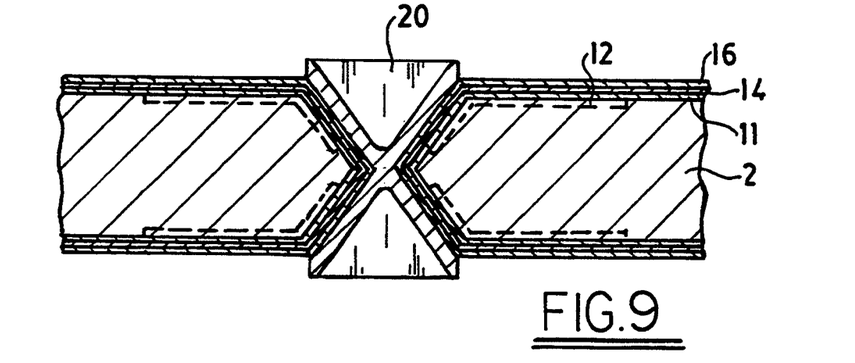
FIG. 9 is a cross-sectional view of the silicon wafer of FIG. 8 with the thick layer of polysilicon removed from the surfaces of the oxide layer and leaving a polysilicon free-mass precursor in the cavity.

Thick polysilicon layer 18 is then partially removed by etching, leaving only a precursor free-mass 20 as shown in the cross-sectional view of FIG. 9. Such etching can be performed by a plasma etch using a mixture of 75% $SF_6$ and 25% $0_2$ at a pressure of approximately 500 millitorr. The process can be performed in a standard commercially-available plasma etcher. Unetched areas are protected from etching by the use of a patterned photoresist as described above. The etching is performed by coating silicon wafer 2 with photoresist, which is exposed and developed before plasma etching. The resist acts as a barrier mask for etching, thereby protecting the mass from the plasma. After the etching, the photoresist is removed, preferably by an oxygen plasma.

Once free-mass 20 has been formed, it can be made movable by removal of sacrificial oxide layer 16 with HF as etching agent, as shown in FIG. 10. Such etching results in the replacement of layer 16 with gap 19. Free-mass 20, while movable within cavity 8, is constrained therein by the complementary shapes of free-mass 20 and cavity 8. Free-mass 20 and cavity 8 are narrowest at their centers, and the ends of free-mass 20 are wider than the narrowest portion of cavity 8. The flared ends of free-mass 20 prevent it from passing out of cavity 8. This constraining effect can best be seen in FIG. 15.

Figure 12:
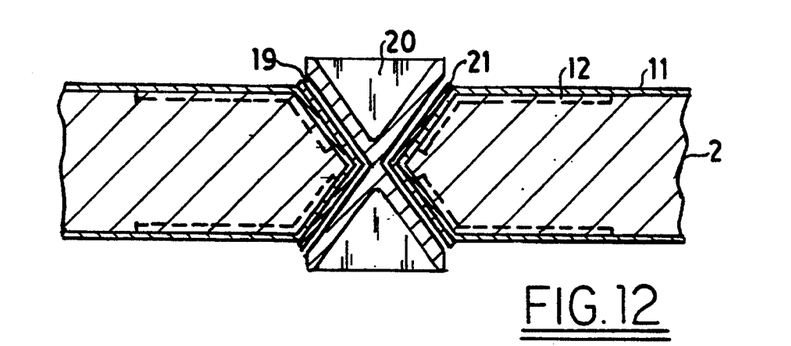
FIG. 12 is a cross-sectional view of the silicon wafer of FIG. 10 with the polysilicon layer removed from the surfaces of the wafer, leaving a polysilicon shield on the surfaces of the cavity.

Next, silicon layer 14 is etched from the horizontal surfaces of wafer 2, preferably by the plasma etching process of reactive ion etching (RIE), leaving only protective silicon layer 21 adjacent space 19, as shown in FIG. 12. RIE etches horizontal surfaces rapidly, whereas other surfaces remain relatively unetched.

Thus, the protective polysilicon in the cavity will remain intact. An insignificant amount of free-mass 20 will also be removed. Protective silicon layer 21 in cavity 19 acts as a protective shield for underlying insulating layer 11 and wafer 2 when free-mass 20 moves. RIE preferably is carried out one side of silicon wafer 2 at a time.

Figure 13:
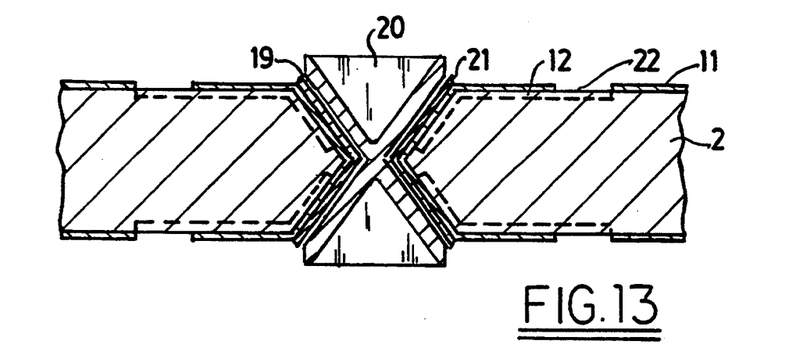
FIG. 13 is a cross-sectional view of the silicon wafer of FIG. 11 with a portion of the oxide layer removed to expose a portion of the electrodes.
Figure 14:
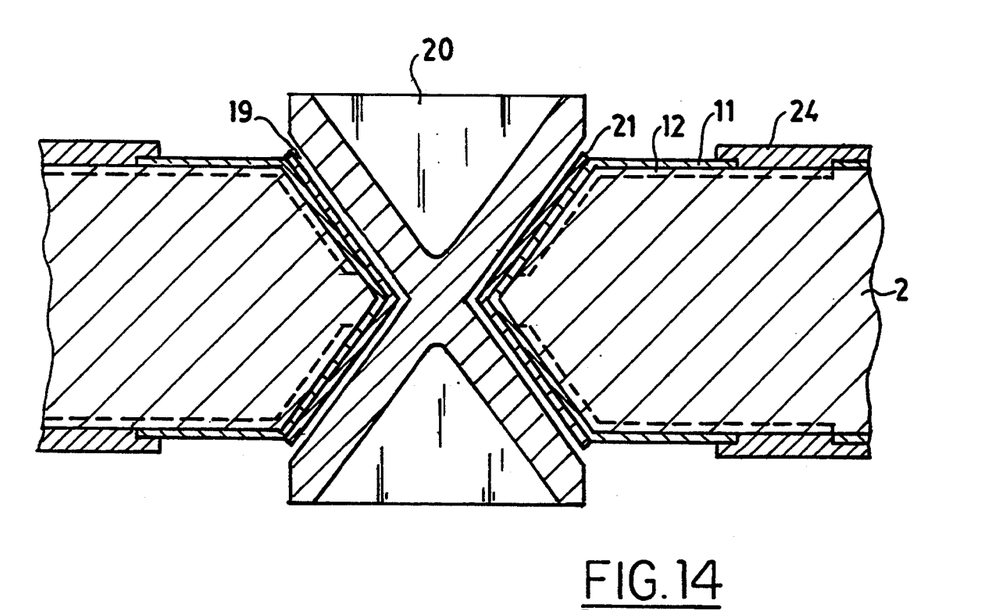
FIG. 14 is a cross-sectional view of the silicon wafer of FIG. 13 with a metallic layer applied over the exposed portion of the electrodes.

Insulating layer 11 over electrodes 12 can then be patterned in preparation for the creation of contact cuts 22, as shown in FIG. 13, by the same method used to create openings in the oxide for creation of electrodes 12 as described above. Specifically, a photoresist is applied, imaged by exposure with ultraviolet light, and developed. Insulating layer 11 then is etched with HF to form contact cuts 22, exposing the doped electrodes. Contact cuts 22 allow for metallic contacts 24 to be applied to electrodes 12, as shown in FIG. 14. These contacts 24 allow for electrical connection of electrodes 12 to circuitry which senses and displays the acceleration.

FIG. 11 shows a plan view of wafer 2 after the formation of electrodes 12 and free-mass 20. As can be seen, the electrode configuration consists of a pair of single electrodes (i.e., 12c and 12f) and a pair of double electrodes (i.e., 12a, 12b, 12d, and 12e). A similar configuration is on the reverse side of wafer 2. The double electrodes provide rotational stability for the free-mass since single opposing electrodes cannot control rotation about the Z-axis, which is perpendicular to the plane of the silicon wafer.

Figure 15:
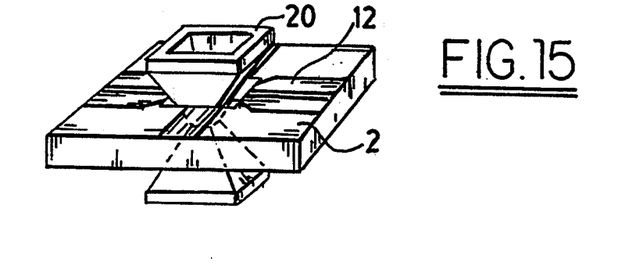
FIG. 15 is a perspective view of the microaccelerometer preform of the present invention.

A perspective view of the microaccelerometer preform is shown in FIG. 15. The configuration of electrodes 12 can be seen for the upper surface of wafer 2. It can also be seen that the shape of free-mass 20 is such that free-mass 20 is moveable within but constrained by the contours of cavity 8.

Figure 16:
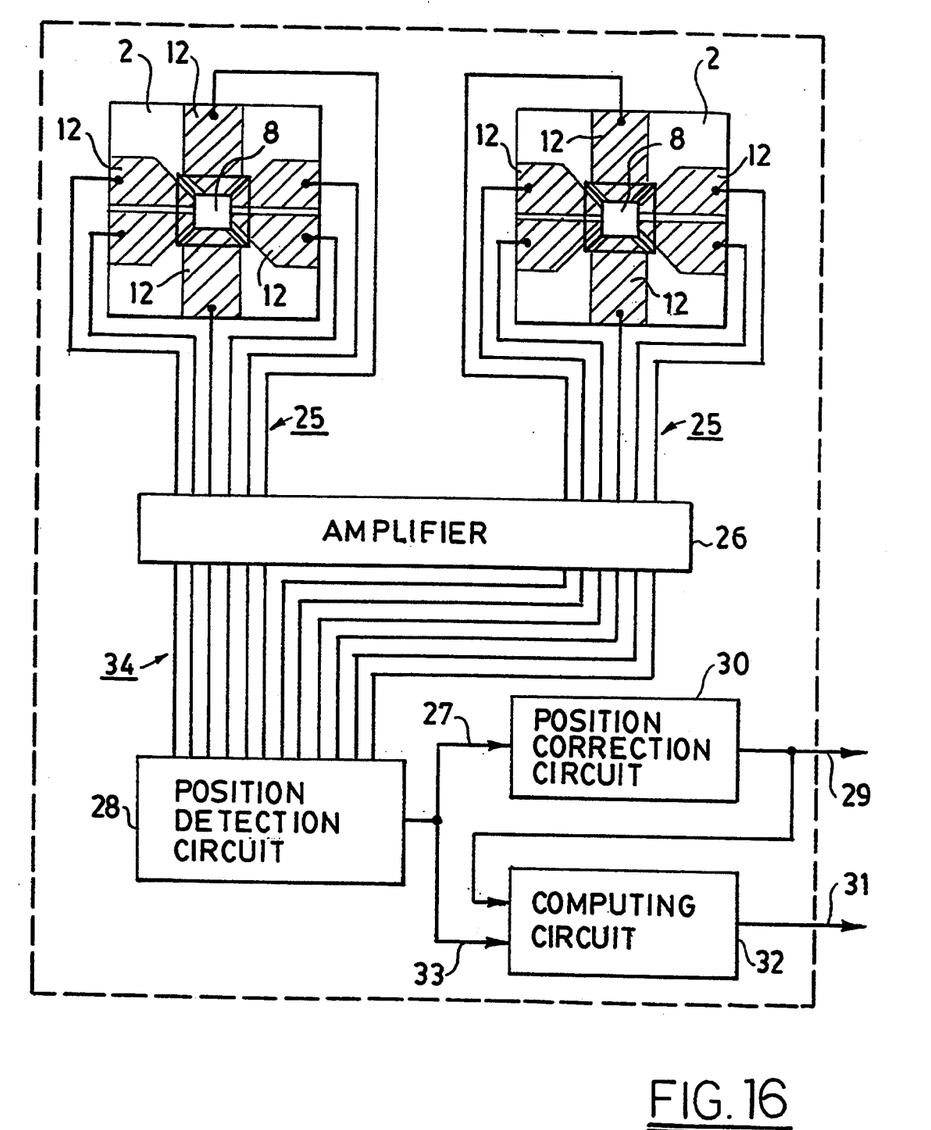
FIG. 16 is a schematic diagram of the microaccelerometer of the present invention.

The microaccelerometer preform of the present invention as shown in FIGS. 14 and 15 can then be included in any microaccelerometer control system. FIG. 16 is a schematic diagram of the microaccelerometer preform of the present invention with suitable electronic control circuitry.

The theory underlying the operation of the microaccelerometer is that changes in the position of free-mass 20 induced by acceleration and the electromagnetic force required to return free-mass 20 to an equilibrium position can be used to determine acceleration by the following relation:

$$\vec{F} = 1/2 \sum_{i=1}^{n} \nabla C_i(V_i - V_o)^2$$

wherein F is the force required to restore free-mass 20 to equilibrium,
$C_i$ is the capacitance between a pair of electrodes,
$V_i$ is the voltage across a pair of electrodes, and
$V_o$ is the reference potential of the electrodes.

The acceleration experienced by the microaccelerometer unit can be calculated by dividing the mass of the free-mass into the force required to return free-mass 20 to and maintain it at an equilibrium position. The force applied to free-mass 20 by changes in velocity has an equal magnitude and opposite direction to the electromagnetic force required to restore the mass's equilibrium position.

When the microaccelerometer is in a state of constant velocity, free-mass 20 is suspended within the cavity by electromagnetic forces from electrodes 12. When the velocity of the vehicle changes, the microaccelerometer, which is physically attached to the vehicle, also accelerates. Free-mass 20, which is suspended only by electromagnetic forces and is not physically attached to the vehicle, will not immediately experience such acceleration, but, instead, will lag behind. The change of position of free-mass 20 with respect to the cavity will change the capacitance of gap 19, which will, in turn, alter the magnetic field at each electrode 12. This change is detected by sensing changes in the position indication signals from each of electrodes 12.

Referring to FIG. 16, position detection circuit 28 senses position indication signal changes indicative of free-mass position and, by comparing each of electrodes 12, can determine the exact position of free-mass 20. A suitable position detection means is disclosed in U.S. Pat. No. 4,393,710 to Bernard ("Bernard"). The position indication signals passing from electrodes 12 to position detection circuit 28 are desirably amplified by signal amplifier 26 which may be mounted directly on wafer 2. Position indication signals are conveyed to amplifier 26 via electrical conductors 25, and after amplification are passed to position detection circuit 28 via electrical conductors 34.

Position detection circuit 28 delivers a detected position signal to position correction circuit 30 via electrical conductor 27, such as the one described in Bernard. Correction circuit 30 directs correction signals to electrodes 12 via electrical conductor 29 to change the electromagnetic field within gap 19 as required to return free-mass 20 to its equilibrium position. Computing circuit 32 receives the correction signals via electrical conductor 31 required to return free-mass 20 to its equilibrium position and the detected position signal via electric conductor 33. Computing circuit 32 is then able to produce an acceleration value using this information. When acceleration ceases, free-mass 20 will accelerate relative to cavity 8 as long as a corrective electromagnetic force is applied. The position of free-mass 20 will have to be restored as described above. The change in capacitance within gap 19 and the voltage across electrodes 12 will enable the computing circuit to calculate the acceleration of the attached vehicle.

It can be seen from the preceding discussion that an improved microaccelerometer and process for fabricating a microaccelerometer preform have been described. Because of its use of sloped surfaces to support its electrodes, the present microaccelerometer can be constructed by micromachining techniques, and therefore can be produced in small sizes at relatively low production cost. The microaccelerometer described herein also has the advantage over cantilever-type microaccelerometers of being capable of measuring acceleration in three coordinate systems with a single free-mass.

While various embodiments of the invention have been described, variations and embodiments thereof within the scope of the invention will undoubtedly suggest themselves to those skilled in the art. Accordingly, the foregoing description should be taken as illustrative and not in a limiting sense.

What is claimed:
1. A microaccelerometer comprising:
    a thin planar sheet having first and second substantially planar surfaces, said sheet having a cavity extending between said first and second substantially planar surfaces, wherein said cavity has a cross-section which has a narrowest point at an interior location in said sheet;

a free-mass having a pair of ends and a central portion between said ends, wherein said free-mass has a cross-section with said central portion being narrower than said narrowest point of said sheet and said ends being wider than said narrowest point of said sheet to locate said free-mass in a position relative to said sheet, whereby said free-mass is restrained by and moveable with respect to said sheet;

sensing means for detecting said free-mass's position relative to said sheet and generating one or more signals indicative of said position of said free-mass;

position correction means for receiving position indication signals from said sensing means, exerting a restorative force on said free-mass to an equilibrium position, and generating one or more signals indicative of said restorative force; and computing means for generating an acceleration value from said one or more signals indicative of said position of said free-mass and said one or more signals indicative of said restorative force.

2. The microaccelerometer according to claim 1 further comprising at least one electrode, said at least one electrode being capable of sending position indication signals and receiving position correction signals, said position indication signals being transmitted to said sensing means and said position correction signals being transmitted from said correction means.

3. The microaccelerometer according to claim 1, wherein said sheet is constructed of a silicon material.

4. The microaccelerometer according to claim 3, wherein said sheet is coated with an insulating layer.

5. The microaccelerometer according to claim 1, wherein said-cavity is configured as opposing frustopyramids having opposed bases proximate said first and second substantially planar surfaces of said sheet.

6. The microaccelerometer according to claim 4, wherein said cavity is configured as opposing frustopyramids having opposed bases proximate said first and second substantially planar surfaces of said sheet.

7. The microaccelerometer according to claim 6 further comprising at least one electrode, said at least one electrode being capable of sending position indication signals and receiving position correction signals, said position indication signals being transmitted to said sensing means and said position correction signals being transmitted from said correction means.

8. The microaccelerometer according to claim 5, wherein said free-mass is configured as opposing frustopyramids having opposed bases and each frustopyramid of said free-mass is aligned with a frustopyramid of said cavity, whereby said free-mass is prevented from leaving said cavity.

9. The microaccelerometer according to claim 8, wherein said free-mass is made of silicon.

10. The microaccelerometer according to claim 6, wherein said free-mass is configured as opposing frustopyramids having opposed bases and each frustopyramid of said free-mass is aligned with a frustopyramid of said cavity, whereby said free-mass is prevented from leaving said cavity.

11. The microaccelerometer according to claim 10 further comprising at least one electrode, said electrode being capable of sending position indication signals and receiving position correction signals, said position indication signals being transmitted to said sensing means and said position correction signals being transmitted from said correction means.

12. The microaccelerometer according to claim 11 further comprising an amplifier, said amplifier being positioned to receive said position indication signals, to amplify said signals, and to apply said position indication signals to said sensing means.

13. A preform for use in an accelerometer comprising:

a thin planar sheet having first and second substantially planar surfaces, said sheet having a cavity extending between said first and second substantially planar surfaces, wherein said cavity has a cross-section which has a narrowest point at an interior location in said sheet and is configured as opposing frustopyramids having opposed bases proximate said first and second substantially planar surfaces of said sheet;

a free-mass having a pair of ends and a central portion between said ends, wherein said free-mass has a cross-section with said central portion being narrower than said narrowest point of said sheet and said ends being wider than said narrowest point of said sheet to locate said free-mass in a position relative to said sheet, said free-mass being configured as opposing frustopyramids having opposed bases and each frustopyramid of said free-mass being aligned with a frustopyramid of said cavity, whereby said free-mass is restrained by and moveable with respect to said sheet in response to acceleration.

14. The preform according to claim 13 wherein said sheet is constructed of a silicon material.

15. The preform according to claim 13 wherein said sheet is coated with an oxide material and a silicon material.

16. The preform according to claim 14 wherein said sheet is coated with an oxide material and a silicon material and wherein said sheet supports at least one electrode.

17. The preform according to claim 16 wherein said sheet supports twelve electrodes.

18. The preform according to claim 13 wherein said sheet supports at least one electrode.

* * * * *